United States Patent [19]

Welkie et al.

[11] Patent Number: 4,659,899

[45] Date of Patent: Apr. 21, 1987

[54] VACUUM-COMPATIBLE AIR-COOLED PLASMA DEVICE

[75] Inventors: David G. Welkie, Chanhassen; Robert L. Gerlach, Minnetonka, both of Minn.

[73] Assignee: The Perkin-Elmer Corporation, Norwalk, Conn.

[21] Appl. No.: 833,575

[22] Filed: Feb. 26, 1986

Related U.S. Application Data

[63] Continuation of Ser. No. 664,195, Oct. 24, 1984, abandoned.

[51] Int. Cl.[4] .......... B23K 15/00

[52] U.S. Cl. .......... 219/121 PN; 219/121 PM; 219/121 PR; 219/121 EQ; 204/192.31; 315/111.21; 174/14 R

[58] Field of Search .......... 219/121 PM, 121 PP, 219/121 PR, 121 PQ, 121 P, 74, 75, 121 EQ; 204/192 E, 192 N, 298; 315/111.21; 174/14 R, 8; 313/231.31, 231.41

[56] References Cited

U.S. PATENT DOCUMENTS

| | | | |
|---|---|---|---|
| 2,547,440 | 4/1951 | Clark et al. | 174/8 |
| 2,961,558 | 11/1960 | Luce et al. | 219/121 EZ |
| 3,162,716 | 12/1964 | Silver | 174/14 R |
| 3,622,782 | 11/1971 | Smith et al. | 219/121 EQ |
| 4,163,889 | 8/1979 | Schoenmakers | 219/121 EQ |
| 4,405,853 | 9/1983 | Klein | 219/121 PP |

FOREIGN PATENT DOCUMENTS

| | | | |
|---|---|---|---|
| 0102392 | 8/1981 | Japan | 219/121 FS |

*Primary Examiner*—M. H. Paschall

*Attorney, Agent, or Firm*—H. S. Ingham; F. L. Masselle; E. T. Grimes

[57] ABSTRACT

A plasma generating device, and in particular a duoplasmatron ion gun, is disclosed that is air cooled, high vacuum compatible and hence very clean with a stable ion current output. The device is mounted to a standard type flange held at ground potential without the necessity of subsequent high voltage isolation. Cooling is achieved with cooling fins and a fan inside a housing in which the duoplasmatron is mounted. A mounting structure includes a vacuum tight ceramic ring brazed between the mounting flange and the gun body. The ceramic ring is located with respect to high permeability magnetic components and a magnetic coil to facilitate a magnetic field for focusing the plasma, allowing the coil to be referenced to ground potential while the gun is maintained at high voltage. A ceramic chamber containing ceramic pellets is located in the plasma-forming gas inlet duct to prevent high voltage electrical discharge in the gas duct. A piezoelectric valve operated by a pressure sensor maintains accurate gas flow and ion output.

19 Claims, 2 Drawing Figures

VACUUM-COMPATIBLE AIR-COOLED PLASMA DEVICE

This application is a continuation of co-pending application Ser. No. 664,195 filed Oct. 24, 1984 now abandoned.

This invention relates to a plasma generating device having a novel mounting structure for supporting the device in vacuum relationship with and in electrical isolation from a system for extracting ions at high voltage, and further having a novel cooling system and an improved gas conduit and valve therefor.

BACKGROUND OF THE INVENTION

A plasma generating device such as a duoplasmatron creates an intense plasma between a cathode and an anode through an intermediate electrode. The plasma is intensified by the constricting action of an orifice in the intermediate electrode and the focusing action of a magnetic field between the intermediate electrode and the anode. Ions are extracted from this plasma at the anode aperture, as a result of an accelerating electric field created by raising the potential of the entire source relative to a grounded extraction electrode near the anode aperture. Cooling of the cathode, intermediate electrode, and anode is required to prevent excessive outgassing and oxidation. Most commonly, this is accomplished by circulating a liquid coolant through passageways in the source structure. This is undesirable because of the attendant design complications, the requirement of a heat exchanger, and the inconvenience of servicing the source. Cooling of these parts has also been done by forcing compressed air through similar passageways, but similar design complications are involved, and a source of compressed air is required.

In order to extract ions from the duoplasmatron source, a potential is applied to the entire source relative to some grounded extraction electrode. In prior designs, the source mating flange and the magnetic coil were also floated at this potential. Consequently, an intermediate insulator section was required to interface the source to any focusing optics, and the circuit that powered the magnet coil was required to float at the high potential.

The plasma forming gas source and valve, which are generally at ground potential, need to be electrically isolated from the gas inlet on the duoplasmatron which is at some high potential. This is accomplished by incorporating a ceramic tube between the gas inlet and the valve. In order to prevent a discharge inside the tube, the tube in past designs has been made long with a small inner diameter. This proves to be a relatively cumbersome design and results in excessive pressure drop through the tube.

An object of the invention is to provide a novel duoplasmatron-type ion source that is ultra-high vacuum compatible, and hence very clean; has a variable magnetic field produced by an integral coil that is at ground potential; has an ion current output that is very stable over time, and is mounted to a standard type flange at ground potential without the necessity of subsequent high voltage isolation.

Another object is to provide a novel cooling system for a plasma generating device.

Yet another object is to provide a novel gas conduit resistant to electrical discharge under very high voltage conditions.

SUMMARY OF THE INVENTION

The foregoing and other objects of the present invention are achieved in a plasma generating device useful as a source of ions while operating at high vacuum and high voltage relative to an ion extracting system. The plasma device comprises a body, a hollow cylindrical cathode member mounted coaxially in a cylindrical cavity in the body, the cavity being connected to a source of plasma-forming gas, and a nozzle anode affixed in thermal contact to the body in coaxial, plasma-forming relationship with the cathode member and the cavity. Where the device (gun) is a duoplasmatron a generally tubular intermediate electrode is mounted in the gun, such that an axial orifice at the gas outlet end of the intermediate electrode is positioned coaxially between the cathode and anode. The tubular intermediate electrode is attached to the gun body. Further, a tubular support member attaches the anode to the body by way of a heat-conducting electrical insulator.

A mounting structure according to the present invention generally encircles the nozzle anode and includes a mating flange adapted for a vacuum sealing connection to an ion extraction system which is at ground potential. A metallic ring is welded to an outer diameter section of the body and extends forward therefrom. A ceramic ring is brazed to the metallic ring and extends further forward therefrom. A second metallic ring is situated further forward between the ceramic ring and the mating flange and is respectively brazed and welded thereto. The mounting structure is formed to support the gun in vacuum relationship with and in electrical isolation from the ion extracting system.

In a duoplasmatron of this invention a ring-shaped magnetic coil is located generally outward of and proximate to the mounting structure. Component parts including body, intermediate electrode and anode are formed of material having high magnetic permeability and arranged such that a generally toroidal shaped magnetic field loop about the coil follows the body, intermediate electrode and anode and traverses the ceramic ring to aid in focusing the plasma. The above-described ceramic ring encircling the anode is integrated in the magnetic loop in close proximity to the magnetic component parts, and is of sufficiently thin cross section for the magnetic flux to easily traverse the ceramic ring, while allowing the coil to be maintained at ground potential.

In a preferred embodiment a plurality of anode cooling fins are disposed externally in thermal contact with the gun body. A housing substantially encloses the gun except for openings for the plasma effluent and cooling air flow. A miniature fan is mounted in the housing to direct cooling air over the fins. Additional cooling fins in the path of the air flow are thermally connected to the cathode member, preferably by way of a thermally and electrically conducting rod extending through the gun body.

In a further embodiment a chamber of ceramic pellets is located in the gas inlet duct to prevent electric discharge in the gas duct. In yet another embodiment a piezoelectric valve operated by a pressure sensor maintains accurate gas flow and ion output.

DETAILED DESCRIPTION OF THE INVENTION

Figure 1:
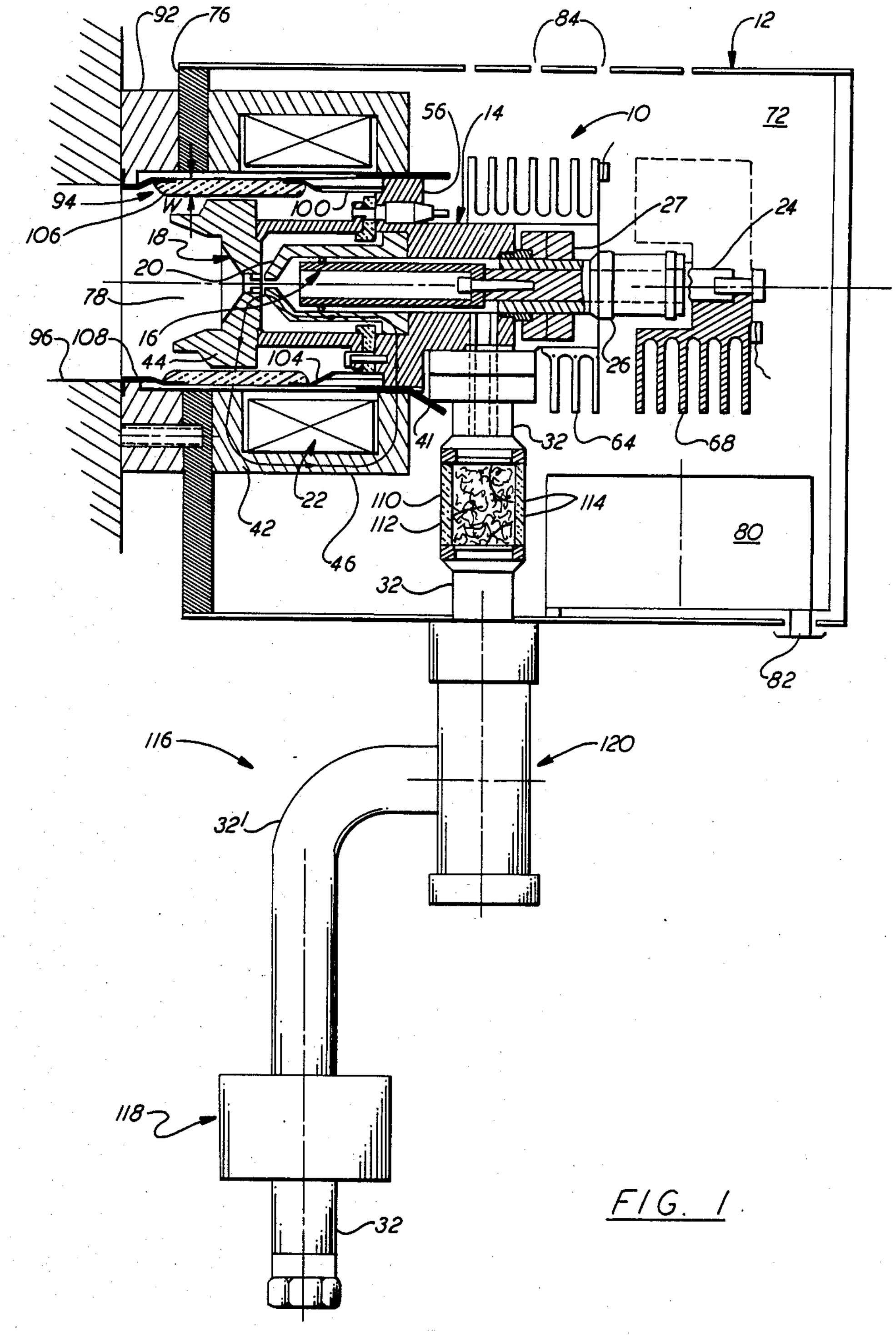
FIG. 1 is a sectional side view of a plasma generating device of the present invention.

Referring to FIG. 1 a plasma generating device comprised of a duoplasmatron (gun) 10 enclosed in a housing 12. The gun basically is formed of a gun body 14, a cathode 16, an anode 18, an intermediate electrode 20 and a magnetic coil 22. The cathode is tubular and is fabricated of nickel and attached by threading, brazing or the like to a supporting rod 24 of similar diameter that extends rearward through and emerges from the gun body. (As used herein, terms "forward" and terms derived therefrom or synonymous or analogous thereto, have reference to the direction in which the plasma effluent is propelled from the gun; similarly "rearward", etc., denotes the opposite direction.) Rod 24 fits through a ceramic sleeve 26, for example alumina, extending from the gun body in a standard coupling 27 to support the cathode member in electrical isolation from the body.

Figure 2:
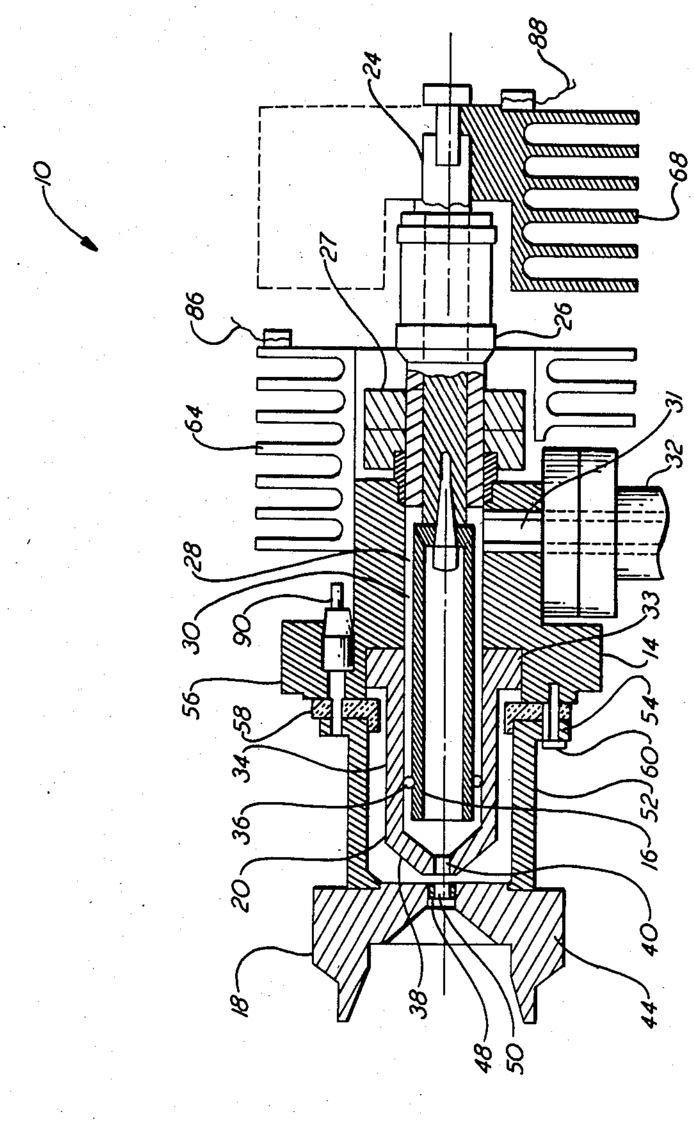
FIG. 2 is a simplified sectional side view of the plasma generating gun shown in FIG. 1.

FIG. 2, for clarity, depicts gun 10 without coil 22 and housing 12. Forward of sleeve 26, a cylindrical cavity 28, in which cathode 16 is mounted, is slightly larger in diameter than the cathode thus forming an elongated annulus 30. A port 31 intersecting rearward portion of the annulus is connected to a gas inlet conduit 32 to receive plasma-forming gas such as oxygen, nitrogen or argon from an external gas supply (not shown).

Intermediate electrode 20 is essentially tubular, has a rear section 33 supported by screws (not shown) in cylindrical cavity 28 in electrical and thermal contact with body 14 coaxially with cathode 16 and has a middle section 34 with an inner diameter with respect to the cylindrical cavity such as to provide a forward extension of annulus 30. Two sets of four small ceramic beads 36 (four beads are shown in FIG. 2) positioned in the annulus provide relative spacing between the cathode and the intermediate electrode. Forward of the cathode, intermediate electrode 20 has a taper section 38 that reduces down to form a small orifice 40 at the forward end axial with the cathode. The intermediate electrode is externally connected electrically to the anode 18 through a resistance of, for example, 10,000 ohms (not shown).

Magnetic coil 22 (FIG. 1) is positioned circumferentially outside of the region of intermediate electrode 20 and is insulated from the body by a sheet 41 of PTFE plastic such as Teflon (TM). In a typical duoplasmatron body 14, the intermediate electrode and nozzle anode 18 are made generally of a material of high magnetic permeability such as a 99% iron alloy. A shell 42 (FIG. 1) of similar material has portions that cover the outer, forward and rear sides of coil 22, and the rim 44 of the anode, also of magnetic material, extends outward nearly to the forward portion of shell 42 to allow a continuous path for magnetic flux. Thus as indicated in FIG. 1 a generally toroidal magnetic current or loop 46 is formed in the magnetically permeable components to aid in focusing the plasma in the gun.

Continuing with reference to FIG. 2, anode 18 has a molybdenum disc 48 inserted in the center with a small opening 50 therein axial with cathode 16 for the plasma effluent. Anode rim 44 is attached by brazing (or screws) to a tubular support member 52 of copper, aluminum or the like, that extends rearward and circumferentially about intermediate electrode 20, the support member terminating in a flange 54. The flange 54 is mounted to a rim 56 of the body with an annular insert 58 therebetween using electrically insulated screws 60. The insert should be an electrical insulator with good thermal conductivity such as berylium oxide to provide both heat conduction and electrical insulation between the anode and the body.

A set of aluminum cooling fins 64 is attached by threading to and circumferentially surrounds the rear portion of body 14, thus providing cooling by the ambient air around the gun. An additional set of aluminum cooling fins 68 of generally cylindrical configuration is attached axially with a screw to supporting rod 24 of cathode 16 rearward of the body. The rod is of copper, aluminum or the like for conducting heat from the cathode to the additional fins.

The gun 10 with cooling fins 64, 68 is mounted in housing 12 (FIG. 1) which has a cavity 72 therein large enough to allow free flow of ambient air about the gun, particularly the fins. The forward end of the gun is attached to an end 76 of the housing having an opening 78 therein for the plasma effluent. An assembly 80 comprised of a miniature fan with driving motor (not shown seperately), of known type used in cooling electronic components, such as model SU2A5 sold by Rotron, is mounted inside the housing. An outlet opening 82 and a plurality of inlet openings 84 in the housing for air are provided. Thus the gun is cooled by means of the air drawn in and caused to flow in a path about the fins by the fan.

Electrical contacts 86, 88 (FIG. 2) for external power connections (not shown) are provided conveniently on the two sets of fins, respectively for cathode member 16 and intermediate electrode 20. Electrical contact for anode 18 is by means of a fitting 90 protruding from copper flange 54 through and insulated from rim 56 of the body.

Continuing with FIG. 1, a vacuum sealing attachment to effluent end 76 of the housing as well as to a mating flange 92 bolted to the housing is accomplished by means of a tubular mounting structure 94. The mating flange is used for attachment to a system 96 (shown only in phantom) for extracting and utilizing ions from the plasma effluent by high voltage for such purposes as sample bombardment for secondary ion mass spectroscopy. Mounting structure 94 electrically isolates the gun from the mating flange, magnetic coil 22, its shell 42 and housing 12 to allow these to be maintained at ground potential.

As shown in detail in FIG. 1, according to the present invention mounting structure 94 includes a stainless steel annular protrusion 100 which extends forward from rim 56 of the body and is welded to the iron alloy thereof. The forward plane of the rim in this case is located approximately in the lengthwise center of cathode 16. A metallic ring 104 of low expansion nickel alloy, such as the commonly known "Kovar" (TM) alloy, is welded to protrusion 100 and extends forward therefrom. (As used herein "weld" includes braze, solder and the like for attaching metal components. "Braze", as used explicitly, includes similar known or desired inorganic methods for attaching ceramic and metal components together. Organic methods are preferably to be avoided to minimize sources of outgassing contamination.) A ceramic ring 106 of elongated cross section is brazed to the metallic ring and extends forward therefrom. For reasons clarified hereinbelow, when a magnetic coil structure (22, 42) is present the ceramic ring is positioned external to anode rim 44. The ceramic ring is formed of high voltage insulating material, for example alumina. A second nickel metallic ring 108 is similarly brazed to and extends forward of the ceramic ring.

Mating flange 92 is welded to the forward part of second metallic ring 108 and is located just forward of gun 10. Mating flange 92 is ring shaped and axial with the gun, and is adapted for attachment to the ion extracting system 96. In operation the ion extracting system and the mating flange may be maintained at or near ground potential. The gun may have a high voltage, such as 10,000 volts applied thereto as required in operation.

The weld and braze seals must be essentially vacuum tight. Thus mounting structure 94 provides electrically isolating support for gun 10 as well as a seal for operation of the gun and the ion extracting system under high vacuum conditions.

The width W of the cross section of ceramic ring 106 is preferably as small as structural strength will allow, to minimize the gap between the magnetically permeable alloy components, viz., anode rim 44 and the forward portion of shell 42 on the coil. Magnetic loop 46 is maintained thereby.

Still referring to FIG. 1, to prevent electrical discharge in the low pressure gas flowing through gas inlet conduit 32 to the duoplasmatron operating at high voltage, an electrically insulating container 110 for example of alumina ceramic is coupled by brazing into the conduit. According to an embodiment of the present invention the container contains a multiplicity of electrically insulating pellets 112 formed, for example of borosilicate glass. Retention means such as a pair of porous plates or screens 114 with orifices (not shown) are located at opposite ends of the ceramic container to retain the pellets therein while allowing easy passage of the gas therethrough.

Pellets 112 should fill at least the cross section of the container in a plurality of layers, preferably substantially filling the container. The pellets should be packed with their adjacent surfaces separated by maximum distances that are less than the average path length of electrons and ions in the gas so as to prevent initiation of electrical discharge, but not so highly packed as to provide significant resistance to flow of the gas. Preferably the pellets are spherical in shape and of similar diameter, for example between about 5% and 15% of the diameter of insulating container 110. A pellet diameter between about 1 mm and about 5 mm is desirable. The insulating container is preferably tubular and should be compact, having a length to inner diameter ratio between about 1 and 10. It is desirable to locate the insulating container of pellets within housing 12 so as to isolate all high voltage sources within the housing.

The use of such a filled ceramic container in other vacuum, high-voltage applications such as other types of ion sources, plasma deposition systems and the like will help prevent similar discharge problems therein.

In a further embodiment of this invention a precision flow metering system 116 (FIG. 1) for the low pressure plasma-forming gas is provided. The system includes a piezoelectric crystal leak valve 118 such as a commercially available unit made by Veeco Instruments Inc. as Model PV-10. This is connected with a threaded joint or the like to the inlet conduit 32 of the gun. A pressure sensor 120 having a signal voltage output, such as thermistor or thermocouple gauge is similarly installed in the duct between the valve and gun. A desirable sensor is "Convectron" (TM) manufactured by Granville Phillips Corp. Using standard circuitry (not shown) the signal from the pressure sensor (a varying electrical resistance in the Convectron) is converted to a voltage proportional to the actual pressure and is compared to a reference voltage proportional to the desired operating pressure. The difference between these two voltages is used to adjust the valve voltage so as to make the actual pressure equal to the desired pressure. The gas flow is thus regulated in inverse proportion to changes in the pressure in the conduit to maintain constant pressure therein. The result is an ion current from the duoplasmatron gun that is very stable over a long period of time.

Typical ranges for operating parameters for the duoplasmatron system of the present invention are as follows: arc voltage, 400 to 900 volts between the anode and cathode; arc current 40 to 100 milliamperes; gas inlet pressure $40\times10^{-3}$ to $100\times10^{-3}$ torr; magnetic coil current about 100 milliamperes; valve voltage 10 to 100 volts; ion acceleration voltage up to 10,000 volts.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A plasma generating device for use as a source of ions while operating at high vacuum and at high voltage relative to an ion extracting system, comprising:

a gun comprising a body having an outer diameter section and having a cylindrical cavity connected to a source of plasma-forming gas, a cylindrical cathode member mounted coaxially in the cylindrical cavity, and a nozzle anode affixed to the body in coaxial, plasma-forming relationship with the cathode member and the cylindrical cavity; and a mounting structure generally encircling the gun, comprising a mating flange adapted for vacuum sealing connection to an ion extracting system in electrical contact therewith, a metallic ring welded to the outer diameter section of the body and extending forward therefrom, a ceramic ring brazed to the first metallic ring and extending forward therefrom, and a second metallic ring situated between the ceramic ring and the mating flange, the second metallic ring being brazed to the ceramic ring and welded to the mating flange, such that the mounting structure supports the gun in vacuum relationship with and in electrical isolation from the ion extracting system.

2. A plasma generating device according to claim 1 wherein:

the gun further comprises an intermediate electrode mounted therein having an orifice located coaxially between the cathode member and the nozzle anode and having an elongated cylindrical middle section surrounding a substantial portion of the cathode member, a ring shaped magnetic coil located generally outward of the intermediate electrode and outward of and proximate to the mounting structure, and a partial shell on the magnet coil having portions on the outer, forward and rear sides of the coil;

the nozzle anode comprises an outer rim located proximate to the ceramic ring; and the intermediate electrode, the nozzle anode, the shell portions and the section of gun body inward of the rear portion of the shell are formed substantially of material having high magnetic permeability such that a generally toroidal shaped magnetic field loop about the electrically energized coil traverses the gun body, the intermediate electrode, the nozzle anode and the ceramic ring to aid in focusing the plasma.

3. A plasma generating device according to claim 1, further comprising an inlet conduit for conveying gas at near-vacuum pressure extending between an external gas source and the cylindrical cavity of the gun body without gaseous discharge occurring in the conduit, an electrically insulating container coupled into the conduit to form a portion thereof, a multiplicity of electrically insulating pellets in a plurality of layers filling the cross-section of the container, and retention means disposed at opposite ends of the container having a multiplicity of orifices therein to retain the pellets while readily conveying the gas therethrough.

4. A conduit according to claim 3 wherein the pellets substantially fill the container and are packed sufficiently to prevent electrical discharge and to render insignificant resistance to gas conveyance.

5. A conduit according to claim 4 wherein the pellets are generally spherical in shape have similar in diameters.

6. A conduit according to claim 5 wherein the pellet diameters are between about 1 mm and about 5 mm.

7. A conduit according to claim 4 wherein the container is tubular in shape and has a ratio of length to inner diameter between about 1 and about 10.

8. A plasma generating device according to claim 3 further comprising a housing within which the gun is mounted, the housing being electrically isolated from the gun, wherein the container is situated within the housing.

9. A plasma generating device according to claim 1, further comprising:

a plurality of anode cooling fins disposed externally to the gun in heat conducting relationship with the nozzle anode;

a housing generally enclosing the gun having an effluent opening for the plasma, an inlet opening for the cooling air and an outlet opening for the cooling air; and a fan mounted in the housing with respect to the gun so as to cause cooling air to flow in a path over the cooling fins.

10. A plasma generating device according to claim 9 further comprising a plurality of additional cooling fins disposed in heat conducting relationship with the cathode member in the path of the cooling air flow.

11. A plasma generating device according to claim 10 wherein a heat conducting rod extends from the cathode member rearward through the body, and the additional cooling fins are attached to the heat conducting rod.

12. A plasma generating device according to claim 9, further comprising an intermediate electrode mounted in heat conducting relationship with the body, having an axial orifice therein located coaxially between the cathode member and the nozzle anode, the nozzle anode being in heat conducting relationship with the body, and the plurality of anode cooling fins being attached to the external surface of the body.

13. A plasma generating device according to claim 9 further comprising:

a rim on the body located radially outward from the cathode member;

a generally tubular intermediate electrode mounted in the gun, having a rear section and a forward end with an axial orifice therein positioned coaxially between the cathode member and the nozzle anode, the rear section being attached to the rim of the body in heat conducting relationship therewith, the body having an external surface with the anode cooling fins attached thereto;

a tubular support member surrounding the forward end of the intermediate electrode and attached circumferentially between the nozzle anode and the rim of the body to support the nozzle anode and conduct heat therefrom; and an annular insert of heat-conducting electrical insulator material interposed between the tubular support member and the rim of the body to electrically isolate the nozzle anode from the intermediate electrode.

14. The plasma generating device of claim 3 wherein the external gas source comprises a piezoelectric crystal leak valve, a conduit for the plasma-forming gas connected between the leak valve and the cylindrical cavity, and a pressure sensor having a signal voltage output and being situated to detect the pressure of the plasma-forming gas at a point between the leak valve and the nozzle anode, and means for applying the signal voltage to the piezoelectric crystal to regulate gas flow through the leak valve in inverse proportion to changes in the pressure.

15. A conduit for conveying gas at low pressure between an external source of gas and a device maintained at high voltage relative to the external gas source without gaseous discharge occurring in the conduit, said conduit extending from the external gas source to the device and comprising an electrically insulating container, a multiplicity of electrically insulating pellets in a multiplicity of layers filling the cross-section of the container, and retention means disposed at opposite ends of the container having a multiplicity of orifices therein to retain the pellets while readily conveying the gas therethrough, the pellets being packed with their adjacent surfaces separated by maximum distances that are less than the average path length of electrons and ions in a low pressure gas in the conduit such as to prevent electrical discharge in the gas.

16. A conduit according to claim 15 wherein the pellets substantially fill the container and are packed sufficiently and to rendor insignificant resistance to gas conveyance.

17. A conduit according to claim 16 wherein the pellets are generally spherical in shape and similar in diameter.

18. A conduit according to claim 17 wherein the pellet diameters are between about 1 mm and about 5 mm.

19. A conduit according to claim 16 wherein the container is tubular in shape and has a ratio of length to inner diameter between about 1 and about 10.

* * * * *